(12) United States Patent
Jaśkiewicz

(10) Patent No.: US 10,774,894 B2
(45) Date of Patent: Sep. 15, 2020

(54) HYDRAULIC DAMPING VALVE

(71) Applicant: Hamilton Sundstrand Corporation, Charlotte, NC (US)

(72) Inventor: Zbigniew Jaśkiewicz, Wrocław (PL)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 276 days.

(21) Appl. No.: 15/869,232

(22) Filed: Jan. 12, 2018

(65) Prior Publication Data

US 2018/0202506 A1  Jul. 19, 2018

(30) Foreign Application Priority Data

Jan. 13, 2017  (EP) .................................... 17461503

(51) Int. Cl.
| | |
|---|---|
| *F16F 9/34* | (2006.01) |
| *B64C 27/51* | (2006.01) |
| *F16F 9/19* | (2006.01) |
| *F16F 9/20* | (2006.01) |
| *F16F 9/512* | (2006.01) |

(Continued)

(52) U.S. Cl.
CPC ................ *F16F 9/34* (2013.01); *B64C 27/51* (2013.01); *F16F 9/19* (2013.01); *F16F 9/20* (2013.01); *F16F 9/483* (2013.01); *F16F 9/512* (2013.01); *F16K 17/0433* (2013.01); *B64C 27/48* (2013.01); *F16F 9/49* (2013.01); *F16F 2228/066* (2013.01); *F16K 1/126* (2013.01)

(58) Field of Classification Search
CPC .... F16K 17/06; F16K 17/0433; F16K 15/026; F16K 1/126; F16F 9/483; F16F 9/34; F16F 9/512; F16F 9/19; F16F 9/20; F16F 9/49; F16F 2228/066; B64C 27/48; B64C 27/51

USPC ........................................ 188/322.13, 322.15
See application file for complete search history.

(56) References Cited

U.S. PATENT DOCUMENTS 2,326,462 A * 8/1943 Johnson .............. F16K 17/0433
                                                    137/494
2,703,217 A * 3/1955 Ashton .................... F16K 15/18
                                                    251/282

(Continued)

FOREIGN PATENT DOCUMENTS

DE        10155629     *  5/2003
DE      102011075620 A1  11/2012

(Continued)

OTHER PUBLICATIONS

Extended European Search Report for International Application No. 17461503.9 dated Jul. 12, 2017, 7 pages.

*Primary Examiner* — Robert A. Siconolfi
*Assistant Examiner* — San M Aung
(74) *Attorney, Agent, or Firm* — Cantor Colburn LLP

(57) ABSTRACT

A damping valve for a hydraulic damper comprises a valve housing comprising an inlet chamber and an outlet chamber. A valve seat is arranged between the inlet chamber and the outlet chamber. A valve element having a cylindrical first portion is slidably received in a cylindrical bore of the valve housing. A second portion of the valve element has a valve surface for selectively engaging and disengaging the valve seat to allow passage of hydraulic fluid between the inlet chamber and the outlet chamber. A spring element is mounted within the valve housing for biasing the valve element into engagement with the valve seat.

17 Claims, 5 Drawing Sheets

(51) Int. Cl.
  *F16K 17/04* (2006.01)
  *F16F 9/48* (2006.01)
  *F16K 1/12* (2006.01)
  *B64C 27/48* (2006.01)
  *F16F 9/49* (2006.01)

(56) References Cited

U.S. PATENT DOCUMENTS

| | | | | |
|---|---|---|---|---|
| 3,337,208 | A * | 8/1967 | Olov | B62D 55/108 |
| | | | | 188/322.5 |
| 4,266,467 | A * | 5/1981 | Keller | F16K 17/04 |
| | | | | 137/493.8 |
| 4,695,226 | A | 9/1987 | Marchitto et al. | |
| 2001/0017334 | A1* | 8/2001 | Vincent | F16F 9/20 |
| | | | | 244/17.27 |
| 2006/0086396 | A1* | 4/2006 | Ando | H01F 7/1607 |
| | | | | 137/625.65 |
| 2007/0056644 | A1* | 3/2007 | Boddy | F16K 31/061 |
| | | | | 137/625.65 |
| 2012/0061194 | A1 | 3/2012 | Yu | |
| 2016/0223045 | A1* | 8/2016 | Baldoni | B60G 15/062 |
| 2016/0273668 | A1* | 9/2016 | Trotzko | F16K 17/06 |

FOREIGN PATENT DOCUMENTS

| | | |
|---|---|---|
| EP | 3073162 A1 | 9/2016 |
| GB | 1203485 A | 9/2016 |
| JP | S5420274 A | 2/1979 |

\* cited by examiner

HYDRAULIC DAMPING VALVE

FOREIGN PRIORITY

This application claims priority to European Patent Application No. 17461503.9 filed Jan. 13, 2017, the entire contents of which is incorporated herein by reference.

TECHNICAL FIELD

The present disclosure relates to hydraulic dampers and in particular to a hydraulic damping valve for use by hydraulic damper.

BACKGROUND

Hydraulic dampers are used in a wide variety of applications. One application may be in the damping of helicopter rotor blades. Helicopter rotor blades may perform undesirable vertical, rotational or longitudinal movements relative to a rotor hub in use and hydraulic dampers may be used in damping such movements The damper typically comprises a damping valve which comprises a spring loaded valve element arranged between inlet and outlet chambers of a valve housing and to which hydraulic fluid is supplied or removed. Depending on the relative pressures existing in the inlet and outlet chambers, the valve element may open to allow hydraulic fluid to pass through a nozzle formed between the valve element and its housing. The flow of hydraulic fluid through passages in the valve provides a damping effect.

The present disclosure provides a damping valve of this type.

SUMMARY

In accordance with this disclosure there is provided a damping valve for a hydraulic damper. The valve comprises a valve housing comprising an inlet chamber and an outlet chamber. A valve seat is arranged between the inlet chamber and the outlet chamber. A valve element has a cylindrical first portion slidably received in a cylindrical bore of the valve housing and a second portion having a valve surface for selectively engaging and disengaging the valve seat to allow passage of hydraulic fluid between the inlet chamber and the outlet chamber. A spring element is mounted within the valve housing for biasing the valve element into engagement with the valve seat. The bore of the valve housing has a closed end defining a bore chamber between an end of the first portion of the valve element and the closed end of the bore. The valve further comprises at least one passage which provides fluid communication between the bore chamber and the inlet chamber when the valve element is in engagement with the valve seat. At least one axially extending channel is formed in a radially inwardly facing surface of the bore (10). A first end of the channel opens into the inlet chamber and a second, opposed end is selectively exposed or closed by the first portion of the valve element as it slides in the bore to selectively communicate the channel with the damping chamber.

In certain embodiments, the at least one passage is provided in the valve housing.

In other embodiments, the at least one passage is provided in the valve element which may have at least one axially extending passage formed therein extending from a first aperture formed at the said end of the first portion of the valve element to at least one second aperture in fluid communication with the inlet chamber.

There is therefore also provided a valve element for a hydraulic damping valve. The valve element comprises a cylindrical first portion for slidable reception in a bore of a valve housing and a second portion having a valve surface for selectively engaging and disengaging a valve seat. The valve element has at least one axially extending passage formed therethrough extending from a first aperture at one end of the first portion to at least one second aperture formed at an opposite end of the first portion or between the first portion and the second portion of the valve element.

The at least one passage through the first portion of the valve element may comprise a central passage which extends axially along the longitudinal axis of the valve element.

The central passage may further comprise at least one angled section extending from an end of the axial passage to the second aperture.

The valve member may comprise a plurality of angled sections, each extending to a respective second aperture.

In such an arrangement the angled sections and the second apertures may be arranged symmetrically around the axis of the valve element.

The first and second portions of the valve element may be connected by a third, smaller diameter section around which the inlet chamber is arranged.

The at least one second aperture may be formed in a fillet joining the first and third sections of the valve element.

The second end of the axially extending channel may a chamfer such that the radial depth of the axially extending channel decreases progressively at the second end of the axially extending channel.

The valve may comprise a plurality of the axially extending channels in the radially inwardly facing surface of the bore.

The axially extending channels may be equispaced circumferentially around the circumference of the bore.

In one embodiment, the valve may comprise a pair of diametrically opposed channels.

The valve element may further comprise one or more axially spaced channels extending circumferentially around an external surface of the first portion of the valve element.

The disclosure also provides a hydraulic damper comprising a piston arranged for reciprocating movement within in a cylinder and dividing the cylinder into first and second fluid chambers, and a damping valve according to the disclosure. A first fluid passage fluidly connects the first fluid chamber to the inlet chamber of the valve and a second fluid passage fluidly connects the second fluid chamber to the outlet chamber of the valve.

The hydraulic damper may further comprise a second damping valve in accordance with the disclosure with a third fluid passage fluidly connecting the first fluid chamber of the cylinder to the outlet chamber of the second damping valve; and a fourth fluid passage fluidly connecting the second fluid chamber of the cylinder to the inlet chamber of the second damping valve.

The piston of the hydraulic damper may be suitably coupled to an element to be damped, for example to a helicopter rotor.

The disclosure therefore also provides a helicopter rotor system comprising a hydraulic damper in accordance with the disclosure and a helicopter rotor, the helicopter rotor being coupled to the piston of the hydraulic damper

BRIEF DESCRIPTION OF DRAWINGS

An embodiment of the disclosure will now be described by way of example only with reference to the accompanying drawings in which.

DETAILED DESCRIPTION

Figure 1:
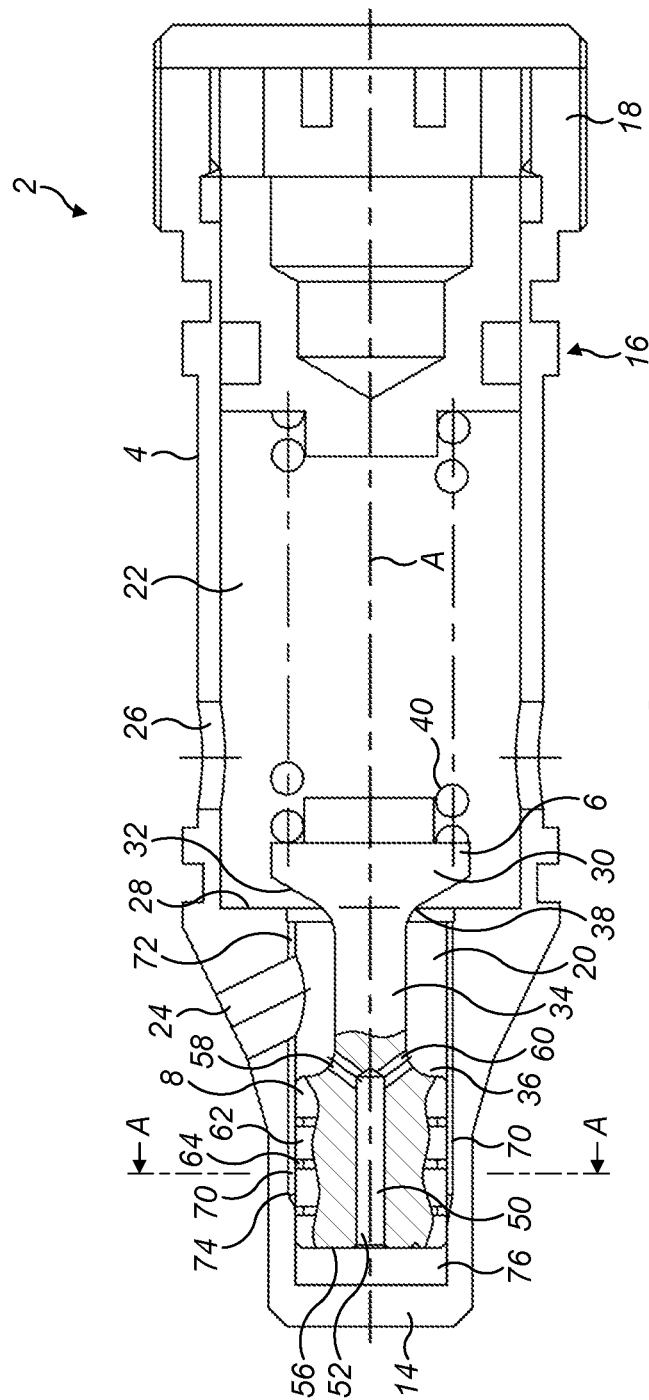
FIG. 1 shows a damping valve in accordance with the disclosure.

With reference to FIG. 1, a damping valve 2 comprises a valve housing 4 and a valve element 6. The valve element 6 comprises a cylindrical first portion 8 which is slidably received in a cylindrical bore 10 formed at one end 12 of the valve housing 4. The bore 10 is closed by an end wall 14. The other end 16 of the valve housing 4 is closed by a cap 18.

The valve housing 4 further comprises an inlet chamber 20 and an outlet chamber 22. An inlet opening 24 opens into the inlet chamber 20 and an outlet opening 26 opens into the outlet chamber 22. The terms inlet and outlet used in this context are relative to fluid flow which will act to open the valve 2. However, as will be described further below, depending on the operative condition of the valve 2, hydraulic fluid may either enter or exit the valve 2 via either of these chambers.

A valve seat 28 is formed between the inlet chamber 20 and outlet chamber 22. The valve seat 28 may comprise an annular edge or annular surface as is known in the art.

The valve element 6 further comprises a second portion 30 having a valve surface 32 which, in a closed condition of the valve 2, seats on the valve seat 28 of the valve housing 4 to close the valve 2.

The first portion 8 of the valve element 6 and the second portion 30 of the valve element 6 are connected by a smaller diameter, third portion 34. The first portion 8 and the third portion 30 are connected by a first fillet 36. The second portion and third portion 34 are connected by a second fillet 38.

A coil spring 40 is mounted between the second portion 30 of the valve element 6 and the cap 18. The coil spring 40 biases the valve surface 32 of the valve element 6 into engagement with the valve seat 28 of the valve housing 4.

The first portion 8 of the valve element 6 comprises a central passageway 50 extending from an first aperture 52 in an end surface 56 of the first portion 8 along the central axis A of the valve element 6. The central passageway 50 is fluidly connected to a pair of second apertures 58 arranged in the first fillet 36 by respective angled sections 60. The second apertures 58 open to the inlet chamber 20 of the valve housing 4.

Of course the second apertures 58 may be provided in a location other than the first fillet 36. What is important is that the second apertures 58 open into, i.e. are in fluid communication with, the inlet chamber 20. Thus in other embodiments, the second apertures 58 may be provided in an axially facing surface of the first portion 8, or in the third portion 34 of the valve element 6.

In the embodiment shown, there are just two angled passage sections 60, angularly spaced apart by 180°. However, more or less second apertures 58 may be provided. Where multiple second apertures 58 are provided, they may be circumferentially equi-spaced about the axis A of the valve element 6.

Also, while a single central passageway 50 has been illustrated in the embodiment, a plurality of axially extending passageways may be provided, for example symmetrically arranged about the central axis A of the valve element 6.

The outer surface 62 of the first portion 8 of the valve element 6 is formed with a plurality of axially spaced grooves 64 extending completely around the circumference of the first portion 8. The grooves 64 act to provide a more even distribution of pressure around the first portion 8 of the valve element 6. In this embodiment, there are three such grooves 64, but more or less grooves 64 may be provided. In certain embodiments, these grooves 64 may be omitted.

Figure 2:
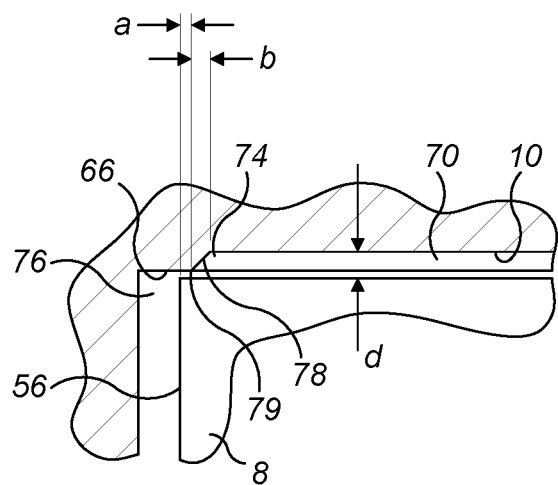
FIG. 2 shows a detail of the valve housing of the valve of FIG. 1.
Figure 3:
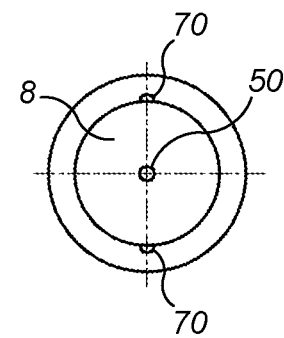
FIG. 3 shows a cross-sectional view along line A-A of FIG. 1.

As illustrated most clearly in FIG. 2, the radially inwardly facing surface 66 of bore 10 is formed with a pair of diametrically opposed, axially extending channels 70. In other embodiments, a single channel 70 may be provided. In other embodiments, more than two channels 70 may be provided. These channels 70 may be circumferentially equi-spaced around the axis A.

Each channel 70 comprises a first end 72 which opens into the inlet chamber 20 of the valve housing 4 and a second end 74 adjacent the end wall 14 of the bore 10. As can be seen in FIGS. 1 and 2, when the valve element 6 is in a closed position, the end surface 56 of the valve element first portion 8 extends beyond the second end 74 of the channel 70 thereby isolating the channel 70 from a bore chamber 76 formed between the end wall 14 of the bore 10 and the end surface 56 of the valve element first portion 8.

The second end 74 of the channel 70 has a chamfer 78 such that the radial depth d of the channel 70 decreases progressively at the second end 74 of the channel 70. In the illustrated embodiment, the chamfer 78 is linear, although in other embodiments, it may have a curved profile.

Having described the structure of the damping valve 2 above, its use in a hydraulic damper will now be described with reference to FIGS. 4 to 7.

Figure 4:
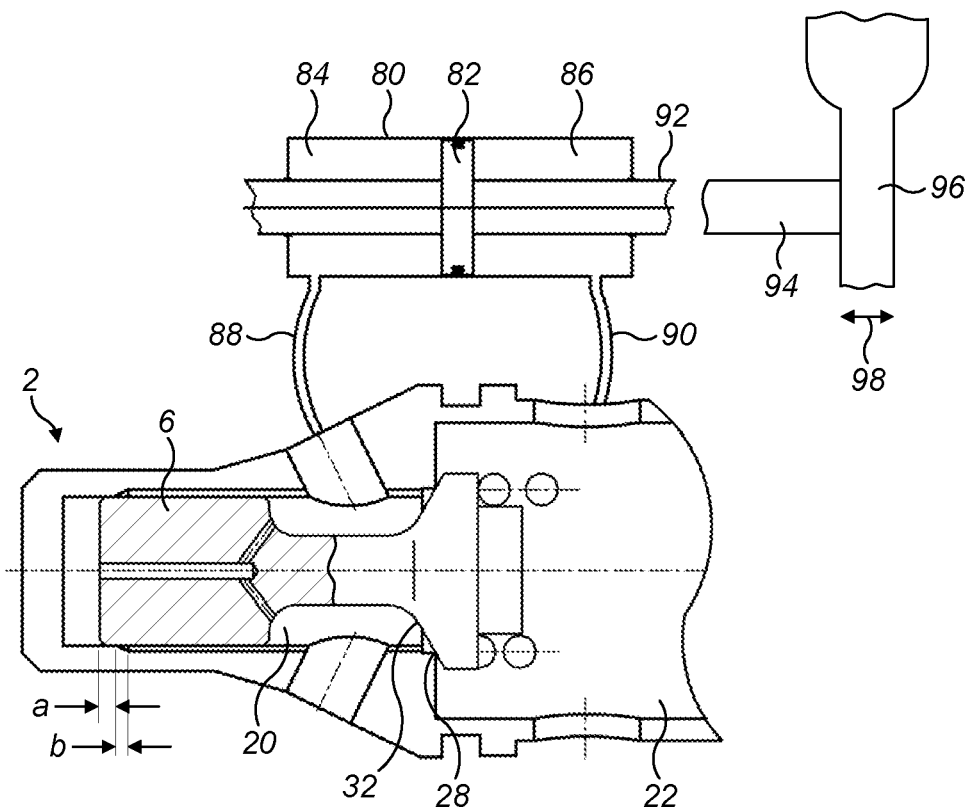
FIG. 4 shows a hydraulic damper incorporating the damping valve of FIG. 1, in a first operative condition.

With reference to FIG. 4, the damping valve 2 is shown connected to a hydraulic cylinder 80 to form a hydraulic damper D. Hydraulic fluid fills both the cylinder 80 and the valve 2. The hydraulic cylinder 80 receives a reciprocating piston 82 which divides the cylinder 80 into a first fluid chamber 84 and a second fluid chamber 86. The first fluid chamber 86 is connected to the inlet chamber 20 of the valve 2 by means of a first fluid passageway 88. The second fluid chamber 86 is connected to the outlet chamber 22 of the valve 2 by a second fluid passageway 90. The valve 2 may be incorporated in a common housing with the cylinder 80 in certain embodiments. The piston 82 has a piston rod 92 which is connected by a suitable linkage 94 to a helicopter blade 96 which, in use, may move backwards and forwards along an axis as illustrated by arrow 98 in FIG. 4.

In FIG. 4, the valve 2 is shown in a closed condition such that the valve element surface 32 engages with the housing valve seat 28. In this condition there is no fluid flow between the inlet chamber 20 and the outlet chamber 22. However, in the event that a force F is applied to the piston rod 92 by the blade 96, the piston 82 forces hydraulic fluid from the first fluid chamber 84 through the first fluid passageway 88 and into the inlet chamber 20 of the damping valve 2. This causes the valve element 6 to move to the right in the sense of the Figures against the force of the spring 40.

Damping is effected in three phases during this opening movement. In a first phase in which the valve element travels over distance "a" as shown in FIG. 4, from its fully closed position to the position in which the end surface 56 becomes aligned with the endpoint 79 of the channels 70, damping is performed by throttling the flow of hydraulic fluid through the opening 100 formed between the valve seat and valve surface, by throttling hydraulic fluid through the passage 50 formed through the first portion of the valve element from the inlet chamber 22 into the bore chamber 76 and by the spring 40.

In a second phase, in which the valve element 6 travels over a distance "b" corresponding to the axial length of the chamfered portion 78 of the channel 70, the damping due to the spring 40 increases as it is compressed and the damping due to the hydraulic fluid is progressively reduced by virtue of additional flow of hydraulic fluid through the channels 70. The damping effect is progressively reduced due to the sloping shape of the channel end 74.

In a third phase, in which the valve element moves beyond the distance "a"+"b", the damping effect of the spring continues to increase and the damping of the oil flow remains at a constant value due to the constant cross-section of the channels 70 and the relatively large gap 100 at the valve seat 28.

When a force F' is applied to the piston rod 92 in an opposite direction to the force F then hydraulic fluid moves from the second fluid chamber 86 of the cylinder 80 through the second fluid passageway 90 into the outlet chamber 32 of the valve 2. This will force the valve element 6 to the left in the sense of the Figures to close the valve 2. However, damping is also effected during this movement.

In a first stage damping is performed by the flow of hydraulic fluid around the valve surface 32 between the valve seat 28 and the valve plug 30 and also by the flow of hydraulic fluid from the bore chamber 76 through the central passage 50 of the valve first portion 8 and the channels 70 in the bore 10 to the inlet chamber 20. This will provide relatively low damping which means that the valve element 6 will move relatively quickly in this first phase.

As the valve element 6 moves further to the left, its end surface 56 will begin to align with the tapering ends 74 of the channels 70 which will increase the damping effect progressively.

Once the end surface 56 of the valve element to moves beyond the end 74 of the channel 70, the throttling will occur only through the central passage 50. This will lead to a relatively higher damping force leading to the valve surface 26 engaging the valve seat 28 relatively softly, thereby protecting the valve element 6 and the valve seat 28.

The speed of closure of the valve element 6 can be influenced by selection of the dimensions of the central passage 50, the dimensions of the channel 70 and also the dimensions and axial extent of the sloping surface 74. For example, the steeper the angle of the chamfer 78 more abrupt will be the deceleration of the valve element during closing. The degree of over travel of the valve element 6 relative to the ends 74 of the channels 70 determines the final closing of the valve and is decisive in the ultimate gentle engagement of the valve element 6 with the valve seat 28.

During middle and high frequency vibrations of the blade 96, little or minimal decrease in damping of the blades occurs due to incomplete closing of the valve between the valve surface 36 and valve seat 28. This is because, in practice, the changes in the movement of the blades transmitted to the piston 82 cause the piston 82 to change direction more quickly than the time required for the valve 2 to close fully. If the valve 2 were to close fully, the piston 82 would be decelerated very suddenly, leading to undesirable forces in the blade, which may, for example, lead to increased wear.

It will be appreciated that the main forces exerted by the hydraulic fluid within the valve 2 are axial. The embodiment illustrated seeks to minimise off axial forces by virtue of the construction of the valve element 6. In this regard, by providing a central passageway 50 through the valve element 6, there is no net lateral force created due to the pressure of hydraulic fluid through that passageway. Similarly, the symmetrical arrangement of the channels 70 and the angled portions 60 of the central passage will also cancel out lateral forces. This will reduce the wear of the valve element 6 the valve housing for 10, thereby extending the life of the valve 2.

Figure 5:
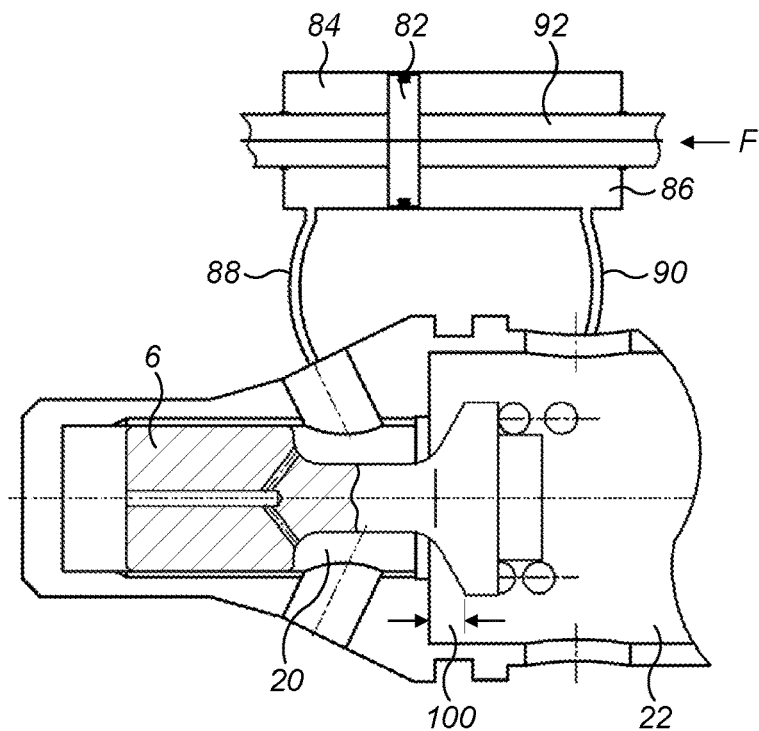
FIG. 5 shows the hydraulic damper of FIG. 4 in a second operative condition.
Figure 6:
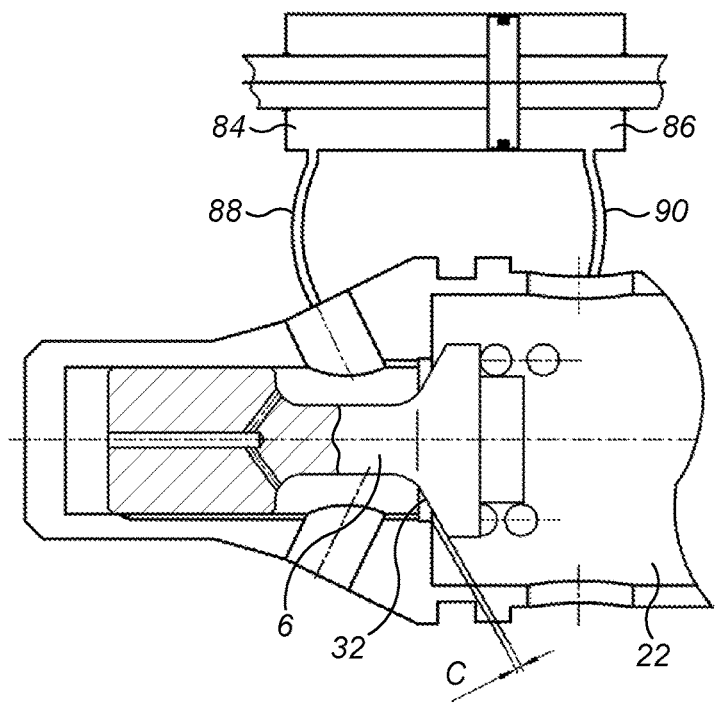
FIG. 6 shows the hydraulic damper of FIG. 4 in a third operative condition.
Figure 7:
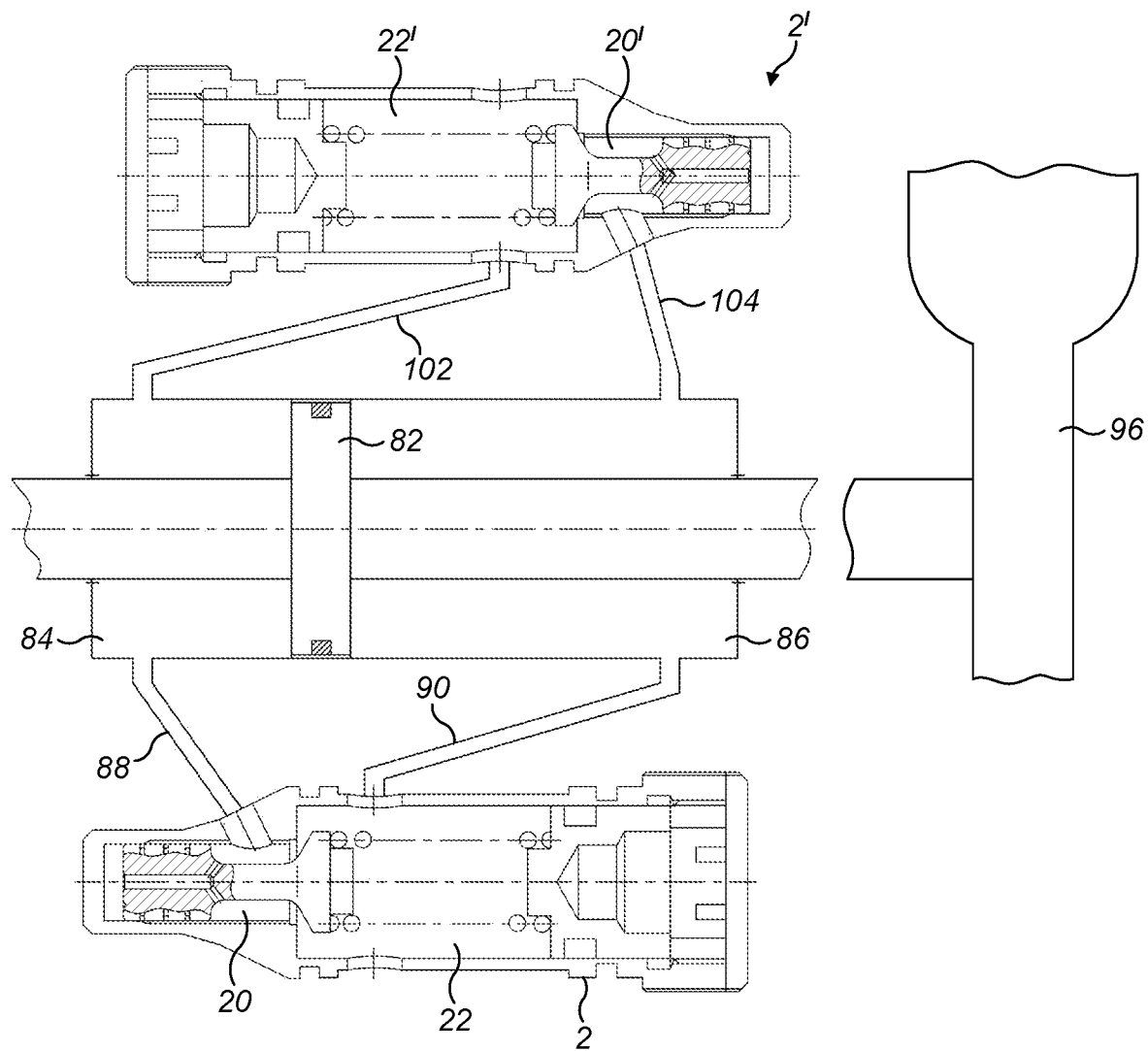
FIG. 7 shows a hydraulic damper incorporating a pair of damping valves.

As illustrated in FIGS. 4 to 6, a single valve 2 is shown coupled to the hydraulic cylinder 80. In the embodiment of FIG. 7, however, the cylinder 80 is connected with two damping valves 2, 2'. The first fluid chamber 84 of the cylinder 80 is connected to the inlet chamber 20 of the first damping valve 2 by means of the first fluid passageway 88. The second fluid chamber 86 of the cylinder 80 is connected to the outlet chamber 22 of the first damping valve by the second fluid passageway 90. However, the first fluid chamber 84 is connected to the outlet chamber 22' of the second damping valve 2' by means of a third fluid passageway 102 and the second fluid chamber 86 connected to the inlet chamber 20' of the second damping valve 2' by a fourth fluid passageway 104. Such an arrangement further improves the damping on the rotor blade 96.

It will be understood that the above description is of just one embodiment of the disclosure and that modifications may be that made thereto without departing from the scope of the disclosure.

Figure 8:
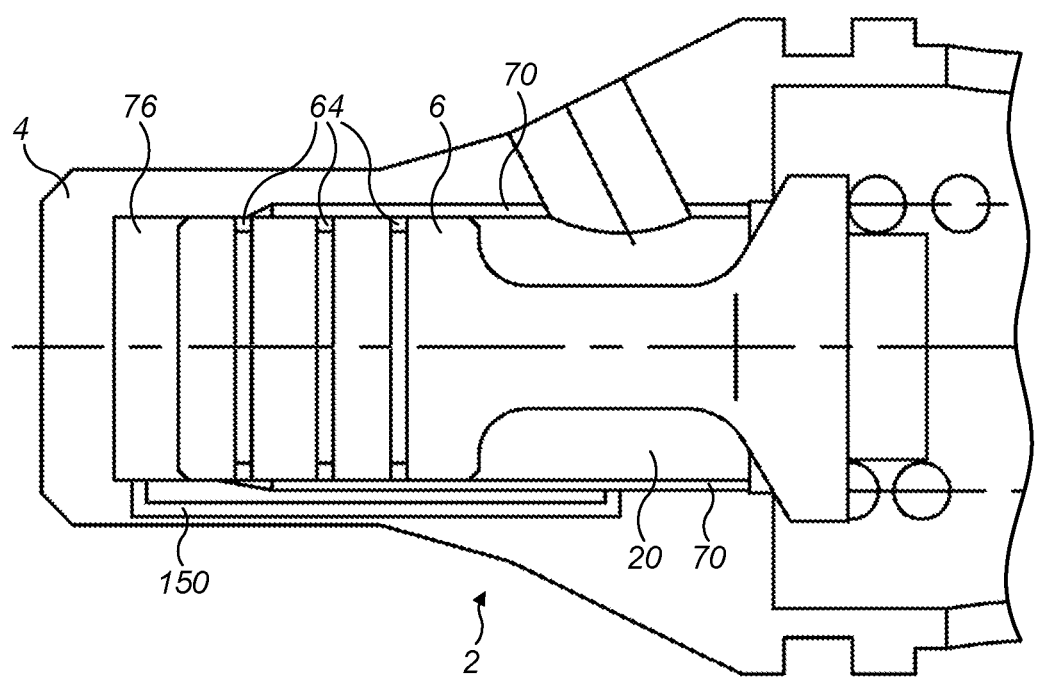
FIG. 8 shows a detail of an alternative embodiment of the invention.

In this regard, the embodiment described above illustrates the passage between the bore chamber 76 and the inlet chamber 20 as passing through the valve element. In an alternative embodiment, however, the passage may be formed through the valve housing 4. Such an embodiment is illustrated in FIG. 8, with a passage 150 passing through the valve housing 4. Multiple such passages 150 may be provided if required. Passages maybe formed through both the valve element 6 and the valve housing 4 in other embodiments.

The invention claimed is:
1. A damping valve for a hydraulic damper, comprising:
a valve housing comprising an inlet chamber and an outlet chamber and containing a hydraulic fluid;
a valve seat arranged between the inlet chamber and the outlet chamber
a valve element having a cylindrical first portion slidably received in a cylindrical bore of the valve housing and a second portion having a valve surface for selectively engaging and disengaging the valve seat to allow passage of hydraulic fluid between the inlet chamber and the outlet chamber;

a spring element mounted within the valve housing for biasing the valve element into engagement with the valve seat;

the bore of the valve housing having a closed end defining a bore chamber between an end of the first portion of the valve element and the closed end of the bore;

at least one passage providing fluid communication between the bore chamber and the inlet chamber when the valve element is in engagement with the valve seat;

at least one axially extending channel formed in a radially inwardly facing surface of the bore, a first end of the channel opening into the inlet chamber and a second, opposed end being selectively exposed or closed by the first portion of the valve element as it slides in the bore to selectively communicate the channel with the bore chamber, wherein the at least one axially extending channel is closed by the first portion of the valve element as the valve surface of the second portion of the valve element approaches the valve seat such that the hydraulic fluid may pass from the bore chamber to the inlet chamber only through the at least one passage, whereby a higher damping force is exerted on the valve element such that the valve surface of the second portion of the valve element engages the valve seat relatively softly.

2. A damping valve as claimed in claim 1, wherein the at least one passage comprises at least one axially extending passage formed in the valve element and extending from a first aperture formed at the said end of the first portion of the valve element to at least one second aperture which communicates with the inlet chamber.

3. A damping valve as claimed in claim 1, wherein the at least one passage comprises at least one passage extending through the valve housing.

4. A damping valve as claimed in claim 2, wherein the at least one passage through the valve element comprises a central passage which extends axially along the longitudinal axis (A) of the valve element.

5. A damping valve as claimed in claim 4, wherein the central passage further comprises at least one section extending at a non-perpendicular angle to the longitudinal axis from an end of the axial passage to the second aperture.

6. A damping valve as claimed in claim 1, wherein the first and second portions of the valve element are connected by a third, smaller diameter section around which the inlet chamber is arranged.

7. A damping valve as claimed in claim 1, wherein the second end of the axially extending channel has a chamfer such that the radial depth (d) of the axially extending channel decreases progressively at the second end of the axially extending channel.

8. A damping valve as claimed in claim 1, comprising a plurality of the axially extending channels in the radially inwardly facing surface of the bore.

9. A damping valve as claimed in claim 8, wherein the axially extending channels are equispaced circumferentially around the circumference of the bore.

10. A damping valve as claimed in claim 9 comprising a pair of diametrically opposed channels.

11. A damping valve as claimed in claim 1, further comprising one or more axially spaced channels extending circumferentially around an external surface of the first portion of the valve, each axially spaced channel extending completely around the circumference of the external surface of the first portion of the valve element.

12. A hydraulic damper comprising:
a piston arranged for reciprocating movement within in a cylinder and dividing the cylinder into first and second fluid chambers;
a first damping valve as claimed in claim 1;
a first fluid passage fluidly connecting the first fluid chamber to the inlet chamber of the first damping valve; and
a second fluid passage fluidly connecting the second fluid chamber to the outlet chamber of the first damping valve.

13. A hydraulic damper as claimed in claim 12 further comprising:
a second damping valve as claimed in claim 1;
a third fluid passage fluidly connecting a first fluid chamber of the cylinder to the outlet chamber of the second damping valve; and
a fourth fluid passage fluidly connecting a second fluid chamber of the cylinder to the inlet chamber of the second damping valve.

14. A helicopter rotor system comprising a hydraulic damper as claimed in claim 12 and a helicopter rotor, the helicopter rotor being coupled to the piston of the hydraulic damper.

15. A damping valve as claimed in claim 5, comprising a plurality of said sections, each extending to a respective second aperture.

16. A damping valve as claimed in claim 15, wherein the said sections and second apertures are arranged symmetrically around the axis (A) of the valve element.

17. A damping valve as claimed in claim 7, wherein the at least one second aperture is formed in a fillet joining the first and third sections of the valve element.

* * * * *